United States Patent [19]

Pawle

[11] Patent Number: 5,774,386
[45] Date of Patent: Jun. 30, 1998

[54] METHOD AND APPARATUS FOR PERFORMING FUNCTION EVALUATION USING A CACHE

[75] Inventor: George Boynton Pawle, North Reading, Mass.

[73] Assignee: Eastman Kodak Company, Rochester, N.Y.

[21] Appl. No.: 633,332

[22] Filed: Apr. 17, 1996

Related U.S. Application Data

[60] Provisional application No. 60/003,490 Sep. 8, 1995.
[51] Int. Cl.[6] .................................................. G06F 17/17
[52] U.S. Cl. ........................ 364/723; 382/300; 395/523
[58] Field of Search ........................... 364/723; 395/523; 382/300

[56] References Cited

U.S. PATENT DOCUMENTS

| | | | |
|---|---|---|---|
| 4,837,722 | 6/1989 | Sara | 364/723 |
| 5,117,493 | 5/1992 | Jensen | 395/425 |
| 5,342,990 | 8/1994 | Rossum | 364/723 |
| 5,684,981 | 11/1997 | Jones | 364/723 |

*Primary Examiner*—David H. Malzahn
*Attorney, Agent, or Firm*—Peyton C. Watkins

[57] ABSTRACT

An interpolation system that breaks a color transform interpolation function into several suboperations or subfunctions. The subfunctions produce intermediate function results. The intermediate results are stored in a cache as the function is evaluated. Cache management operations locate and assign a cache cell to the intermediate results. In a subsequent evaluation that requires the same intermediate results, the intermediate results are obtained from the cache. The cache look-up rapidly provides the intermediate results which are then used to complete the function evaluation.

6 Claims, 5 Drawing Sheets

5,774,386

METHOD AND APPARATUS FOR PERFORMING FUNCTION EVALUATION USING A CACHE

CROSS REFERENCE TO RELATED APPLICATION

Reference is made to and priority claimed from U.S. Provisional Application Ser. No. 60/003,490, filed Sep. 08, 1995, entitled METHOD AND APPARATUS FOR PERFORMING FUNCTION EVALUATION USING A CACHE.

BACKGROUND OF THE INVENTION

1. Field of the Invention

The present invention is directed to a system that performs function evaluations of functions with a plurality of input variables and, more particularly, to a system that stores intermediate results of function evaluation in a cache allowing future evaluations to avoid performing part of the evaluation required, particularly in color transformations which utilize interpolation of tabulated functions.

2. Description of the Related Art

Functions or equations that are used in color science typically are functions of several variables that commonly include a number of multiplication operations. A multiplication operation in a personal computer, or a more powerful work station, is an operation that takes a considerable amount of time and is the slowest mathematical and/or logic operation performed by the computer. As a result, performing function evaluations that include multiplications can take a considerable amount of time compared to functions that do not include multiplication operations. Because some functions, such as many in the field of color science, are so complex and many times nonlinear they require representation by equations with a large number of variables. Rather than perform transform operations with such complex functions, many of such complex functions are represented in a tabular form called tabulated functions. In this representation a precalculated table substitutes for the equation form of the function and the table entries contain the results of the function calculation for corresponding input variable samples. When evaluating such a function the input variables are used as indices to an entry in the table that corresponds to the calculated output. When the possible number of input variable values is small, such tables can have an entry for each set of possible inputs. However, when the number of possible inputs is large the table becomes very large and occupies a large amount of memory. Since these types of tables are commonly maintained in RAM rather than in disk memory, this can become a problem when the tables get very large. Such tables do get very large when color functions are represented in tabular form. For example, a three-channel RGB color transformation where each input/output variable or channel is an 8 bit value will require 8M table entries of 24 bits or 3 bytes each for a total of 24M bytes. When a CMYK function is represented in a table with the same resolution, the table grows to 4G entries of 32 bits or 4 bytes each for a total of 12G bytes. Because of this memory space problem, designers of color transformation processes have typically created tables that have only a sampling of the output results for only a representative set of possible input variable values. That is, the table is a sparse table. For example, the typical RGB table includes 4K entries. Because such tables are not complete, whenever the actual input variable values fall in between the indices of the table, the output value must be estimated since an entry for that particular set of input variable values does not exist in the table. To do this estimation, it is typical to perform an interpolation using the table entries around the target or desired output value. For example, in a three-dimensional RGB table eight values or interpolation coefficients closest to the desired output value are used. Several interpolation methods are available to perform this estimation operation, such as tetrahedral interpolation and trilinear interpolation. Trilinear interpolation is an interpolation operation that requires several multiplications, for example a trilinear interpolation for an RGB function requires thirteen multiplication operations, as shown in equation 1 below, and for a CMYK function additional multiplications are performed. Trilinear or quadrilinear interpolation can thus be slow.

What is needed is a system for making functions that include multiplications faster to perform on personal or workstation type computers.

SUMMARY OF THE INVENTIONS

It is an object of the present invention to speed up the evaluation of functions of multiple input variables.

It is another object of the present invention to speed up the evaluation of color science type functions.

It is also an object of the present invention to speed up the evaluation of interpolation functions particularly those that use a considerable number of multiplication operations, such as trilinear interpolation.

It is an object of the present invention to separate a function that includes multiple multiplication operations into subsets of operations that produce intermediate results and store some or a portion of the intermediate results in a cache, so that future inputs that would produce the same intermediate results need not have the multiplication operations associated therewith performed.

It is an additional object of the present invention to use a caching method which has a high cache hit rate while utilizing a small cache.

The above objects can be attained by a system that partitions a function, such as a trilinear interpolation function into several suboperations or subfunctions that each produce intermediate results. The intermediate results are stored in a cache as the function is evaluated. When a subsequent evaluation that requires the same intermediate results is performed, the results are located in the cache and the cache look-up operation substitutes for the suboperations. When a function, such as a trilinear interpolation function for a tabulated color science function that will produce a large number of cache hits because the same color often appears in a picture a large number of times, is evaluated using such a cache speed of the evaluation of the function can be considerably enhanced.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is a method and apparatus used to speed up the evaluation of functions of several variables. The invention uses a cache of intermediate results. The intermediate results of evaluating the function at one or more of the function variables are saved in the cache. When evaluating the function for or at a given set of variables, the cache is first checked to find out if the intermediate results are in the cache. If the intermediate results for this set of variables are in the cache, then the intermediate results are retrieved from the cache and used with the remaining variables to complete the evaluation of the function. If the intermediate results for this set of variables are not in the cache, the intermediate results for this set of variables are calculated, stored in the cache and then used with the remaining variables to complete the evaluation of the function. The method of the present invention is useful for evaluating tabulated functions in which look-up tables are used and is particularly useful for color transformation functions and interpolations.

Figure 1:
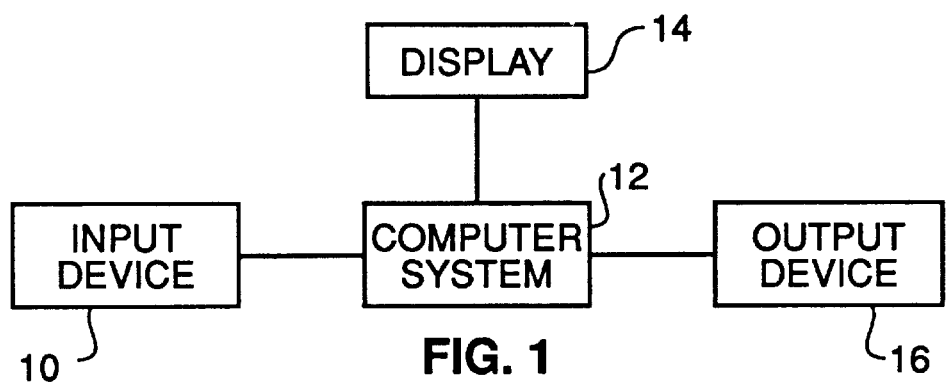
FIG. 1 depicts a typical hardware configuration used by the present invention.

The present invention is typically implemented in a system such as that of FIG. 1 where input devices 10, such as image scanners, cameras and image storage devices such as a PHOTO CD system, etc. supply an image to a computer system 12, such as a personal computer or workstation like the POWER MAC computer by Apple Computer, Inc. The computer system 12 will perform various operations on the image, such as applying various color transformation functions to an input color vector. The image can then be displayed for review and revision on a CRT or other type display 14 or supplied to another type of output device 16, such as a printer or storage device.

Figure 3:
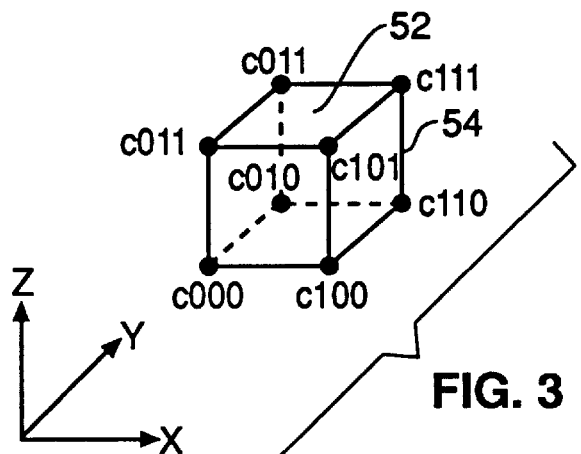
FIG. 3 depicts a cube of points in a table surrounding a desired point that does not exist in the table.
Figure 2:
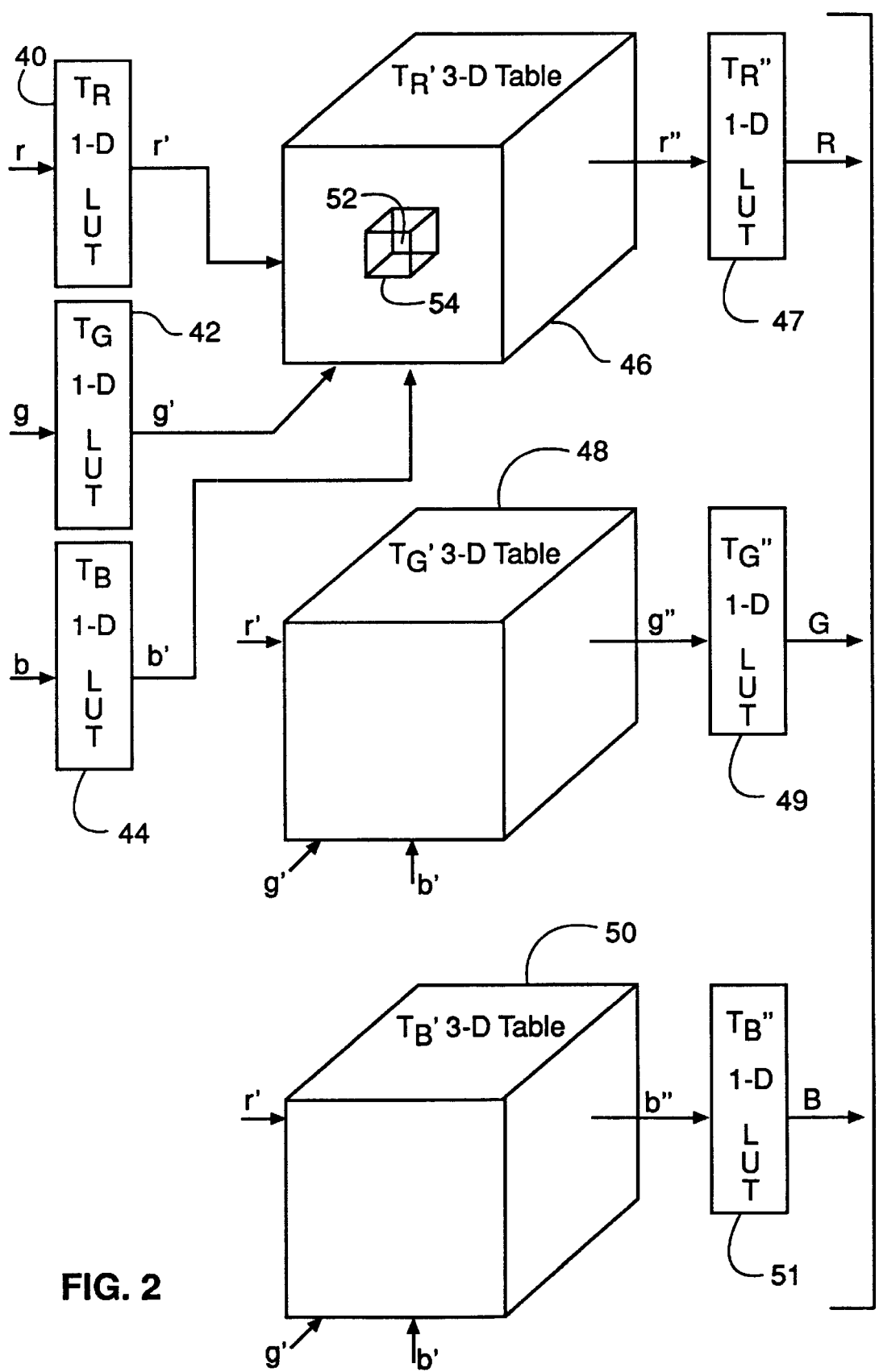
FIG. 2 illustrates a three-channel color transformation operation using one-dimensional an three-dimensional look-up tables.

One type of function that is evaluated by the computer system 12 is a tabulated function where the values of the color pixels of the image are used to look-up the pre-evaluated results of the function in a table. Such a function evaluation is illustrated in FIG. 2 for an arbitrary RGB transformation that inputs an RGB signal vector and outputs a different RGB signal vector. Typically, one-dimensional look-up tables 40, 42 and 43, which perform operations such as prefiltering, produce table indices r'g'b' that are used to access a three-dimensional look-up or grid table 46 to an output r" which is then passed through another one-dimensional look-up table 47 to produce one of the evaluation outputs R. This operation is performed for all three of the color channels, so that the tables 49 and 51 produce the G and B transformed values. Whenever the input values r'g'b' correspond to indices of the table, such that an entry in the table exists for the input values, the operation is a simple memory read out operation that uses the input values r'g'b' as table indices. However, when the input values fall between the table indices and an output value 52 located between the table entries is needed, an interpolation, such as a trilinear interpolation, is performed to obtain the output value. A trilinear interpolation for a three-dimensional table, such as the RGB table of FIG. 2, requires the calculation of equation 1 below:

$$x = c000 + zc * (c001 - c000) + yc * (c010 + \\
zc * (c011 - c010) - (c000 + zc * \\
(c001 - c000))) + xc * (c100 + zc * (c101 - c100) + \\
yc * (c110 + zc * (c111 - \\
c110) - (c100 + zc * (c101 - c100))) - (c000 + \\
zc * (c001 - c000) + yc * (c010 + zc * \\
(c011 - c010) - (c000 + zc * (c001 - c000))))) \quad (1)$$

where c000–c111 are the eight table values or coefficients in the cube 54 surrounding the point of interest 52 to be produced as illustrated in FIGS. 2 and 3. Note. a four dimensional table will include 16 coefficients. There are three values zc, yc and xc used as interpolants. An interpolant is used to find the in-between value in a systematic way. In linear interpolation it is a measure of the distance from a starting value to an ending value and is commonly a ratio. For example, if the desired value is ¾ of the way between the starting and ending points, the interpolant is 0.75. The interpolant can be calculated using conventional techniques or the interpolant can be read from a table, such as tables 40, 42 and 44. The values c000–c111 can also be read from the table 46 (or 48 and 50 when appropriate). As can be seen from equation 1 the three-dimensional interpolation requires several multiplications and a four-dimensional interpolation which would be required for evaluating a CMYK tabulated function requires even more. Since the tables 46, 48 and 50 used for the function can be rather sparse the interpolation operation can be performed very often during an image transformation.

To reduce the number of multiplications required the present invention divides the interpolation operation into stages or subfunctions corresponding to the dimensions of the cube 54 shown in FIGS. 2 and 3 and then stores the results of one of the stages in a cache.

In the first stage or dimension the following subfunctions are computed:

$$z1 = c000 + zc * (c001 - c000) \quad (2)$$
$$z2 = c010 + zc * (c011 - c010) \quad (3)$$
$$z3 = c100 + zc * (c101 - c100) \quad (4)$$
$$z4 = c110 + zc * (c111 - c110) \quad (5)$$

In the second stage or dimension the following subfunctions that use the results of the previous stage are computed:

$$y1 = z1 + yc * (z2 - z1) \quad (6)$$
$$y2 = z3 + yc * (z4 - z3) \quad (7)$$

In the last stage or dimension the following subfunction that uses the results of the prior stages is computed:

$$x = y1 + xc * (y2 - y1) \quad (8)$$

It is the four intermediate data point results of equations or subfunctions (2)–(5) of the first stage that are stored in the cache. The results of the first stage which interpolates the Z dimension of the table can be used again for many different values of the Y and X dimensions of the function. This allows the evaluation of a set of variables that has the same Z value to be evaluated with a look-up of four variables and the computation of three subfunctions that include a total of three multiplications. This results in two advantages: 1) the cache hit rate is significantly increased since cached values can be used by many different X and Y values; and 2) there is a reduction from seven to three operations when the first stage calculations do not have to be performed and the function is merely divided into subfunctions, which is a reduction in the number of multiplication operations. For example, if the R component in a series of color values stays the same for a number of pixels, such that the other components R and G change, then the intermediate results of the R interpolation can be reused repeatedly. As a result, if the images to be processed have any consistencies of color where a particular color channel value does not change often, then this channel should be selected as the Z or first stage intermediate variable. This will result in an additional increase in speed of transformation over random selection of the channel for the first stage. Note that additional stages or dimensions can be cached if desired, however, the cache grows rapidly as the number of dimensions increases. If a higher dimensioned function is being evaluated, such as a CMYK function, additional stages are required, the first stage will include more data points (eight for CMYK), thereby avoiding more multiplications, and it may be desirable to cache more than one stage in such higher dimensional situations.

Figure 4:
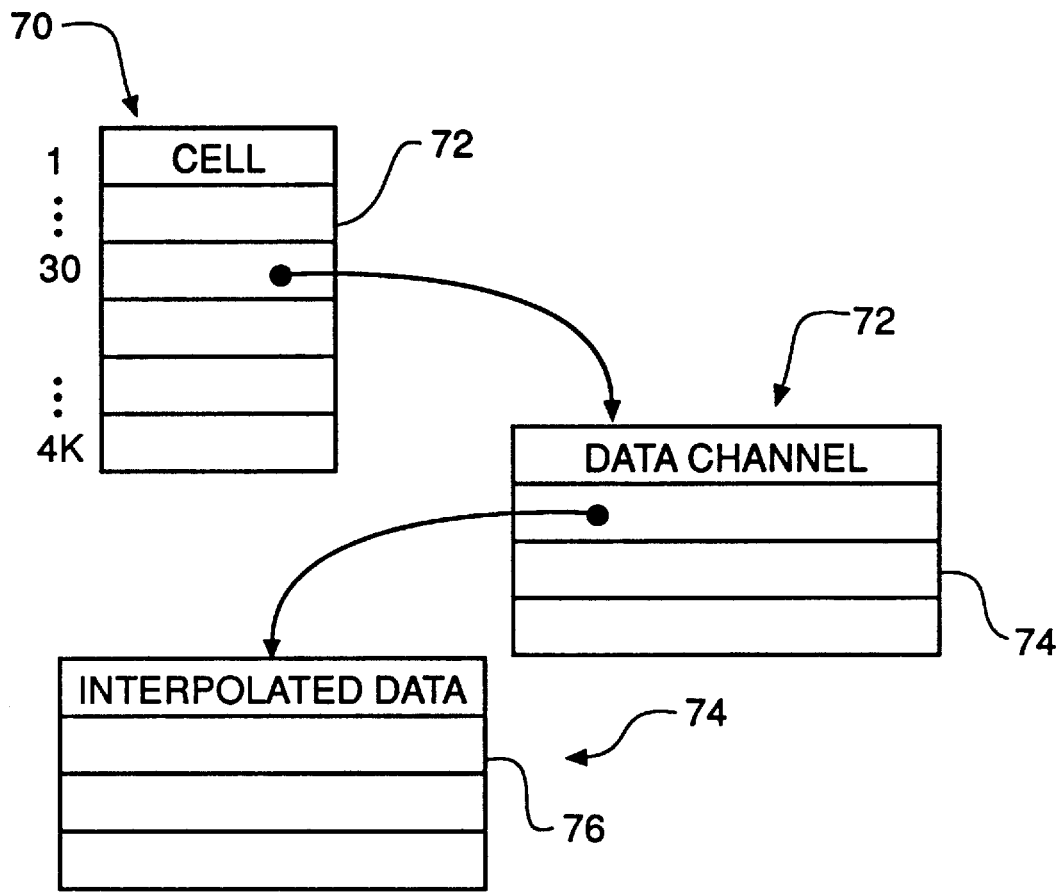
FIG. 4 illustrates the data structure of a cache or cache table used in the present invention.

The cache 70 or cache table, as illustrated in FIG. 4, includes cells 72 for holding the intermediate results of the first stage subfunction evaluations and could be of any size, however, for most RGB images and RGB tabulated function interpolation transformations a cache of 4K cells appears to be the best size to balance cache hit rate against memory requirements. Each cell 72 holds the data for all of the output channels of the evaluation or transformation. In the case of an RGB evaluation three channels are stored and for CMYK four are stored. For address calculation purposes space for four channels is provided in RGB evaluations, that is, four channel slots 74 are provided. Each channel slot 74 stores the four 16 bit intermediate results or first stage interpolation data or data points 76 for the four subfunction computations (2)–(5) discussed above.

Figure 5:
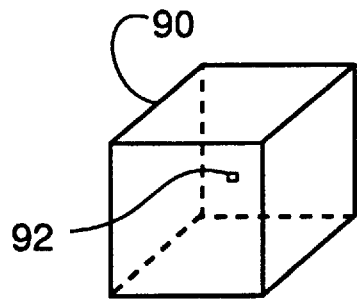
FIG. 5 illustrates the data structure of a three-dimensional cell identification table used the present invention.

Because the cache 70 is preferably limited in size, the present invention reuses the cells 72 of the cache 70. To reuse the cells, a three-dimensional cell identification (ID) table 90, as illustrated in FIG. 5, is provided that contains cell identifiers 92 which are the cell addresses of the cells that are being used. If the cell address is zero, the intermediate results for the input values are not being stored in the cache 70. For example, the cell ID table 90 at the grid index 43 could contain 30 indicating that cell 30 is being used. The cell ID table 90 has as many entries as would be required if every possible set of intermediate results for every vector could be stored in the cache 70. If the RGB vector is represented by 8 bit vector components, and there are 16 entries in the R and G dimensions of the grid table, this table 90 will have 64K entries of 4 bytes each.

Only a single cell ID table 90 is needed to identify the cells of the cache 70, however, the dimensions of the table may change depending on the dimension of the function being evaluated.

Figure 6:
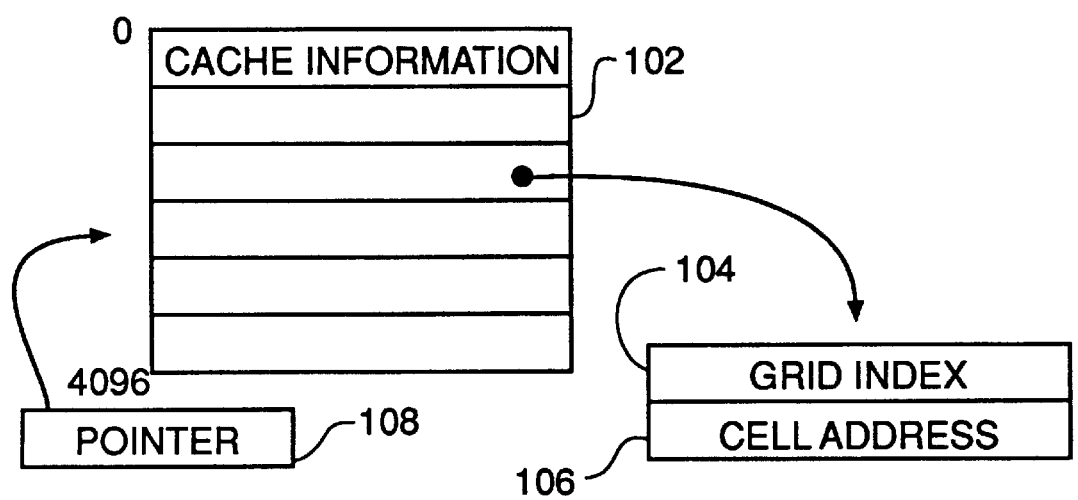
FIG. 6 illustrates the data structure of a cell list used in cache management in accordance th the present invention.

In association with the cell ID table 90 is a single circular cell list 100, as illustrated in FIG. 6, that includes 4K cache information entries 92 (the same number as the number of cells in the cache 70) with each entry including a grid index 104 of four bytes identifying a location in the cell ID table 90 that is using the cell at the cell address 106. If the grid index 104 is −1 rather than a positive value it indicates that this particular cell identified by the cell address 106 is not being used. For the example being discussed the grid index 104 is 43 and the cell address 106 is 30. The cell list 100, as previously mentioned, is a circular list that is accessed using a pointer 108, updated after each set of new intermediate results are stored in the cache 70, that indicates the next cell to use for storing the intermediate results. As new intermediate results are calculated if the cell 72 designated by the pointer 108 is empty, the results are stored in the empty cell. If the cell is being used, the cell contents are over written.

The table 90 and the list 100 are used to manage the contents of the cache 70. Other cache management schemes can be used, such as least recently used or least often used, however, the overhead associated with cache management must be balanced against the savings in multiplication operations avoided. If the cache could be of the size necessary to store all the intermediate results for all possible color outputs, the table 90 and list 100 would not be needed and the function evaluation would not need to carry the overhead of the cache management operations 132 discussed below with respect to FIG. 8. It is possible to reduce the size of the cell ID table 90 by only using the high order bits of the blue (B) vector component, together with the R and G offsets, to form the index into table 90 and the remaining low order bits as an index into subcells of the cache 70 at the cell address from table 90. However, each cell of the cache 70 would have to be subdivided into addressable subcells and the number of data points stored in each cell would increase, thereby increasing the size of the cache 70. A balance between the size of the cache 70 and the size of the table 90 would be necessary in this alternate embodiment.

Figure 7:
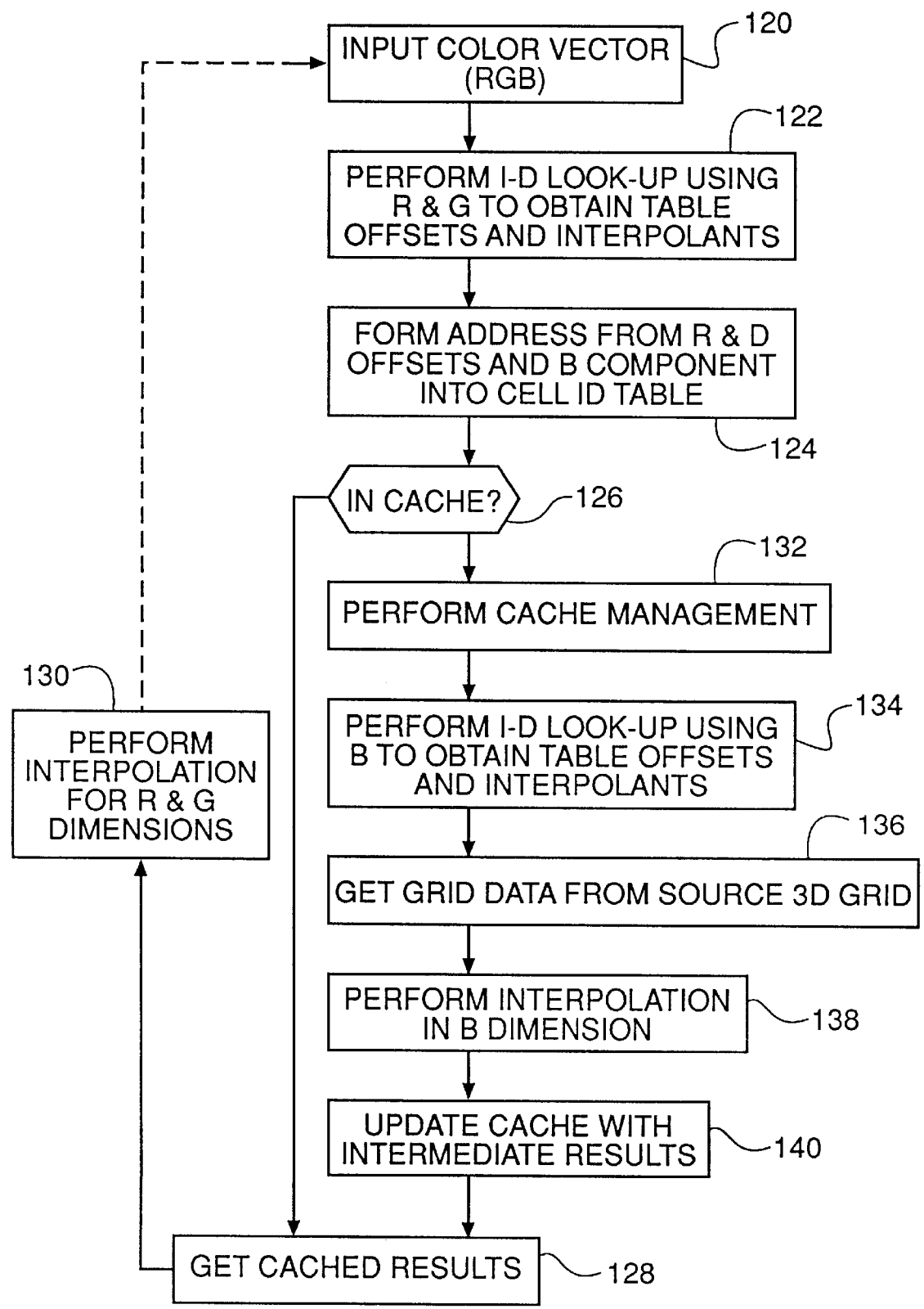
FIG. 7 is a flow chart of the operations performed in evaluating a function in accordance with the present invention.
Figure 8:
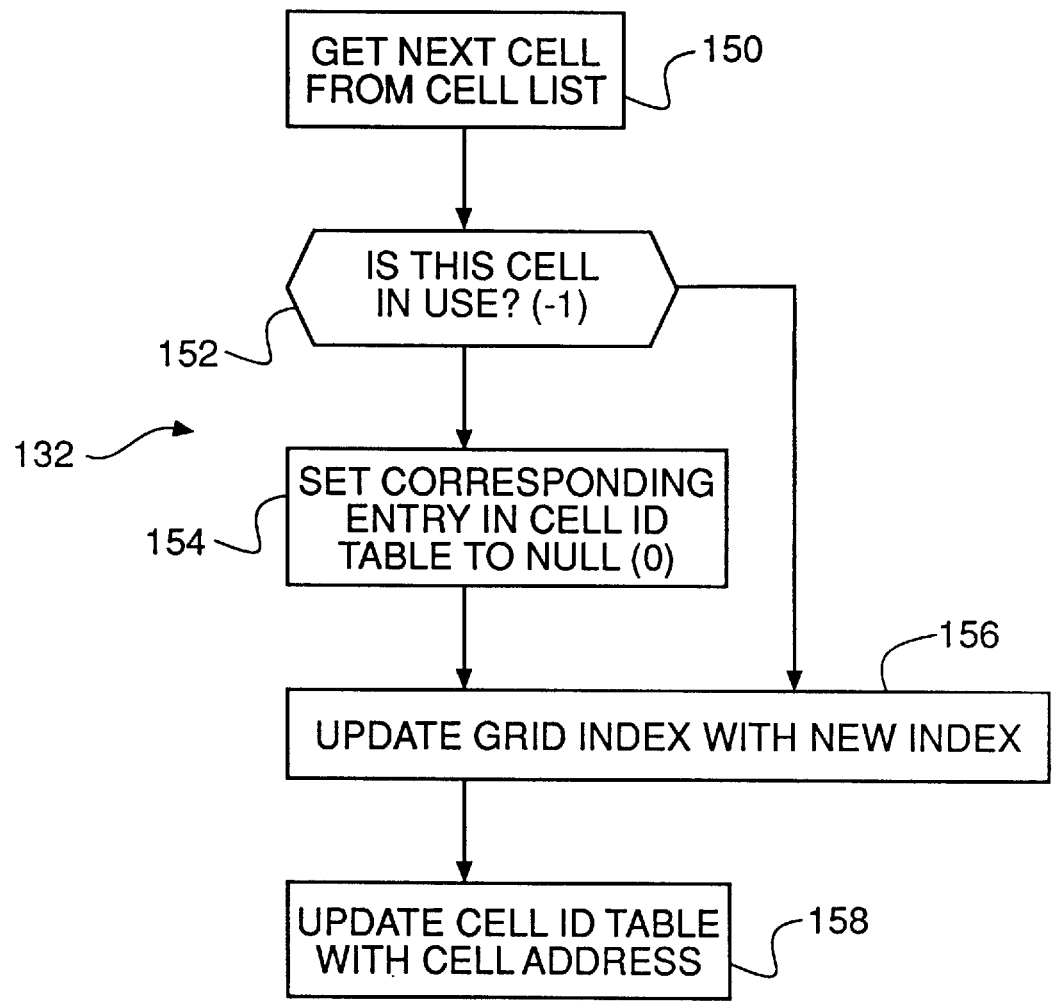
FIG. 8 is a flowchart of cache management operations in the present invention.

The flow of the operations of the present invention is illustrated in FIG. 7 and starts with the input 120 of a color vector RGB where R corresponds to the X dimension of the interpolation, G corresponds to the Y dimension and B corresponds to the Z dimension. The R and G variables are used to access 122 the one-dimensional look-up tables 40 and 42 to obtain the table offsets for these two dimensions and the interpolants yc and xc. The table offset is the index of the beginning of the set of points used in the interpolation for that dimension. Note that by not performing a table look-up using the B vector component at this point in the process, a look-up step is saved if the intermediate results are in the cache 70. The R and G offsets and the B vector component are used to form 124 an index into the cell ID table 90. This cell ID table address or location is used to determine 126 if the intermediate results for this interpolation are located in the cache 70 by looking in that location in the cell ID table 90 for a cell address. If the cell address is zero, the intermediate results for this interpolation have not been previously obtained. If the intermediate results are located in the cache 70, the cell address from table 90 is non-zero and is used to obtain 128 the intermediate results from the cache 70 and they, along with the yc and xc interpolants, are used to perform 130 the interpolations for the R and G dimensions, that is, the second and third stages previously discussed. The process then returns to input 120 a new vector if the transformation is to be continued. If the determination at step 126 indicates that the intermediate results for the blue interpolation dimension are not in the cache 70, the cache management operations 132, discussed in more detail with respect to FIG. 8, are performed to obtain a cache cell in which the intermediate results to be calculated can be stored. Next, the one-dimensional table look-up using table 44 is performed 134 to obtain the table offset and the zc interpolant for this blue or Z dimension. The offsets for each dimension are used to obtain 136 the table entries (the eight coefficients c000–c111) in the grid table surrounding the point 52 of interest. The interpolation for the first stage is then performed 138 using the Z or blue interpolant zc. The results of the interpolation are used to update 140 the cache 70 and the flow continues with the interpolation 130 for the second and third stages. Note that the above operations assume that the table look-ups, evaluations, etc. are being performed for all three channels at each step.

The cache management operation 132 of FIG. 7 can be located anywhere between steps 126 and 140 with the location shown between steps 126 and 132 being arbitrarily selected. During the cache management operations of step 132, as shown in FIG. 8, the pointer 108 is used to get 150 the next cell from the list 100. The next step 152 is to determine whether this cell is being used by comparing the grid index 104 to −1. If the cell is being used (the grid index is not −1), the corresponding entry in the cell ID table 90 is set 154 to null or zero. Next, the grid index 104 is updated 156 with the new index (the index used in step 126 to determine whether that location is cached). Then, the cell ID table is updated 158 with the new cell address. If the cell was not being used at step 152, the grid index is updated 156, followed by the cell ID table 90 update 158.

Because the invention relies on having the contents of the cache 70, ID table 90 and list 100 present certain values, the present invention requires that these data structures be initialized with certain values. For example, the entries 92 of the cell ID table 90 are initialized to zero, the grid index 104 in each entry 102 of list 100 is initialized to −1, the cell address 106 of each entry 102 in list 100 is initialized to the address of the corresponding cell 72 of the cache 70 and the pointer 108 is set to point to the first entry in list 100. The data points 76 in cache 70 can also be set to zero.

Because the present invention speeds up the process of evaluating multi-variable functions, the present invention will allow the evaluation of more complex, and presumably more accurate, functions (for example, higher order interpolations) than have previously been evaluated in the same amount of time as the simpler functions were formerly evaluated. It is also possible to use one interpolation method for determining the data to be put into the cache and a different interpolation method for completing the evaluation. This would allow further balancing of the trade-off between speed and precision of the evaluation.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

| Reference Number List | |
|---|---|
| 10 | Input device |
| 12 | Computer system |
| 14 | Display |
| 16 | Output device |
| 40,42,44 | Input look-up tables |
| 46,48,50 | Grid tables |

-continued

| Reference Number List | |
|---|---|
| 47,49,51 | Output look-up tables |
| 52 | In between point |
| 54 | Surrounding point cube |
| 70 | Cache or cache table |
| 72 | Cache cell |
| 74 | Cell channel |
| 76 | Interpolated data point of cell |
| 90 | Cell identification table |
| 92 | Grid index location |
| 100 | Cell list |
| 102 | Cell list entry |
| 104 | Grid index value |
| 106 | Cell address |
| 108 | Pointer |
| 120-158 | Flow chart steps |
| r,g,b,r',g',b',r'',g'',b'',R,G,B | Color values |

What is claimed is:

1. A method of evaluating a function having a plurality of input variables, comprising the steps of:

partitioning the function into first and second sets of subfunctions, in which the first set subfunctions are functions of a first subset of the input variables, and the second set subfunctions are functions of a second subset of the input variables and intermediate results of the first set subfunctions, the partitioning is such that the functional composition of the second set subfunctions with the first set subfunctions is equivalent to the function;

using the first subset of the input variables to determine if said intermediate results exist in a cache memory;

when said intermediate results do not exist in cache memory, evaluating the first set of subfunctions using the first subset of input variables to obtain intermediate results;

storing the intermediate results in a cache memory;

completing evaluation of the function by evaluating the second set subfunctions using the intermediate results and the second subset of the input variables; and performing subsequent evaluations of the function by usig the intermediate results when the intermediate results exist in the cache memory.

2. The method as in claim 1 further comprising the step of providing the function as a multidimensional interpolation operation evaluated in successive stages in which each stage corresponds to an interpolation in a particular dimension, wherein said first set subfuctions are the first set of stages corresponding to the first set of dimensions of the multidimensional interpolation operation and said second set subfunctions are the remaining stages corresponding to remaining dimensions of the multidimensional interpolation operation.

3. The method as in claim 2 further comprising the step of interpolating the first set of subfunctions between vertices of the first dimension and the second subset of subfunctions are the remaining stages corresponding to the remaining dimensions.

4. The method as in claim 1 further comprising the step of providing the original function as a color transformation function.

5. A method of performing a color interpolation function evaluation, comprising:

inputting a color vector;

performing a one-dimensional table look-up using the vector to obtain grid table offsets and interpolants;

forming an address into a cache cell ID table using the offsets;

determining whether intermediate results of function evaluation are stored in a cache by examining contents of the cell ID table at the address;

obtaining the intermediate results from the cache when the intermediate results are in the cache;

performing a subfunction evaluation using grid table contents designated by the offsets and the interpolants to obtain the intermediate results when the intermediate results are not in the cache:

performing cache management operations to locate a storage location in the cache;

storing the intermediate results in the cache at the location when the intermediate results are not in the cache; and performing the interpolation function evaluation with the intermediate results.

6. An apparatus, comprising:

a computer system, comprising:

means for evaluating a function of a plurality of input variables means for partitioning the function into first and second sets of subfunctions, in which the first set subfunctions are functions of a first subset of the input variables, and the second set subfunctions are function of of a second subset of the input variables and results of the first set subfunctions, the partitioning is such the at the functional composition of the second set subfunctions with the first set subfunctions is equivalent to the function;

a cache memory storing results of the first set of subfunctions; and means for subsequently evaluating the function using the intermediate results stored in said cache memory.

\* \* \* \* \*